United States Patent [19]
Tanaka

[11] Patent Number: 5,165,717
[45] Date of Patent: Nov. 24, 1992

[54] AIRBAG SENSOR FOR AIRBAG RESTRAINT SYSTEM

[75] Inventor: Manabu Tanaka, Kanagawa, Japan
[73] Assignee: Nissan Motor Co., Ltd., Yokohama, Japan
[21] Appl. No.: 738,981
[22] Filed: Aug. 1, 1991
[30] Foreign Application Priority Data
Aug. 9, 1990 [JP] Japan .................................. 2-210720
[51] Int. Cl.[5] .............................................. B60R 21/32
[52] U.S. Cl. .................................... 280/734; 280/735; 200/61.45 R
[58] Field of Search ....................... 280/806, 734, 735; 180/282; 200/61.45 R, 61.45 M, 61.53; 102/252, 253, 272

[56] References Cited
U.S. PATENT DOCUMENTS
5,092,628  3/1992  Tamura et al. ........................ 280/734

OTHER PUBLICATIONS
Service Manual Published in Sep. 1989 by Toyota Motor Co., Ltd.

*Primary Examiner*—Mitchell J. Hill
*Assistant Examiner*—Paul Dickson
*Attorney, Agent, or Firm*—Pennie & Edmonds

[57] ABSTRACT

An airbag sensor for triggering the inflation of an airbag forming part of an airbag restraint system for an automotive vehicle, during a vehicle collision. The airbag sensor is arranged to be locked to disable the triggering function during maintenance and test run upon loosening a locking releasing bolt, and to be unlocked to normally function during norman driving of the vehicle upon tightening the bolt. A sufficient tightening of the locking releasing bolt provides closing of an electric circuit to operate a warning device which informs a mechanic of completion of the locking releasing.

7 Claims, 4 Drawing Sheets

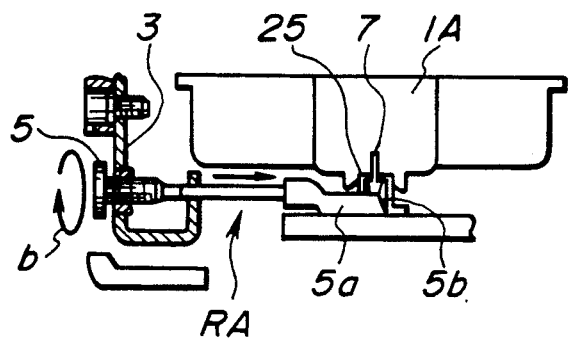
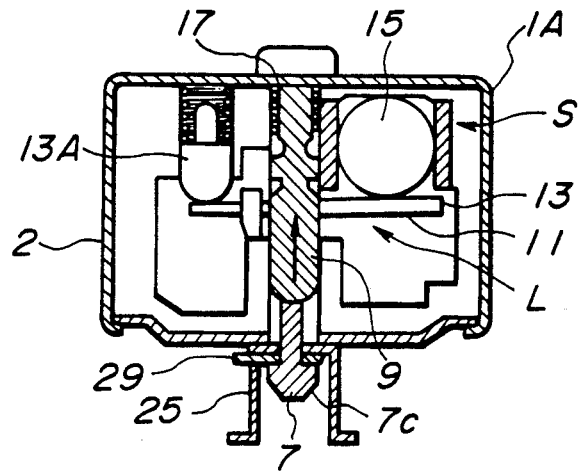
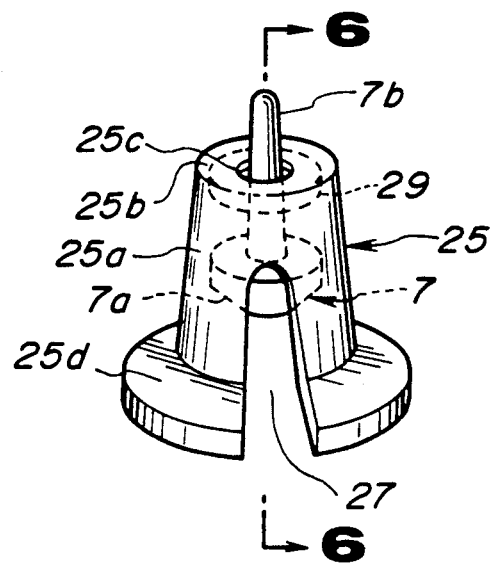

AIRBAG SENSOR FOR AIRBAG RESTRAINT SYSTEM

BACKGROUND OF THE INVENTION

1. Field of the Invention

This invention relates to improvements in an airbag sensor for actuating an airbag restraint system to protect a vehicle passenger from coming into direct contact with either a steering wheel or a front windshield in the event of a serious vehicle collision, and more particularly to a locking releasing device for releasing the airbag sensor from locking for disabling the function of the airbag sensor.

2. Description of the Prior Art

A variety of airbag restraint systems have been proposed and put into practical use for an automotive vehicle. Such airbag restraint systems are usually arranged such that when an impact force at a vehicle collision exceeds a predetermined level, an airbag stored in its folded state in a padded steering wheel or an instrument panel is inflated and developed thereby softening an impact of a vehicle passenger against the instrument panel or the front windshield. The inflation of the airbag is accomplished by operation of an inflator. The inflator is operated upon actuation of an initiator carried out in response to a signal output from the sensor mechanism of an airbag sensor such as a collision sensor provided in the airbag restraint system. Thus, the airbag sensor sensor mechanism is adapted to sense the high impact force and trigger the inflation of the airbag.

The airbag sensor is equipped with a locking mechanism which is arranged to lock the sensor mechanism so as to prevent the airbag from unnecessarily inflating and developing during a maintenance or a test run of the vehicle. The locking mechanism is manually operated by a mechanic to lock the sensor mechanism during the maintenace or the like and to release the sensor mechanism from locking after completion of the maintenance or the like. It is thus, necessary that the locking mechanism have provisions to release the sensor mechanism from the locking when a user drives the vehicle equipped with the airbag restraint system.

However, an operation of releasing the locking mechanism from locking against the sensor mechanism has been accomplished by manually rotating a locking releasing bolt associated with the locking mechanism. This is carried out during a maintenance operation of the vehicle by a mechanic. Accordingly, there is the possibility that the vehicle equipped with the airbag restraint system may be supplied to a user in a state the locking mechanism has not yet been released from the locking. Thus, the conventional airbag sensor is unavoidably poor in operational reliability.

SUMMARY OF THE INVENTION

It is an object of the present invention to provide an improved airbag sensor for an airbag restraint system, arranged to solve problems encountered in the conventional airbag sensor.

Another object of the present invention is to provide an improved airbag sensor for an airbag restraint system, arranged to raise its operational reliability.

A further object of the present invention is to provide an improved airbag sensor for an airbag restraint system, arranged to be able to be completely released from locking for disabling the function of the airbag sensor.

A first aspect of the present invention resides in an airbag sensor for an airbag restraint system which comprises a triggering device for triggering an inflation of an airbag, and a locking device for locking the triggering device so as to disable the triggering device from triggering in its first state, and unlocking the triggering device to trigger in its second state. A locking releasing device is provided to put the locking device into the second state and includes a locking releasing pin movable to a predetermined position at which the locking device is put into the second state. The locking releasing pin is made of a conductive material. A pin holder is provided such that the locking releasing pin is movably disposed therein. The pin holder is made of a non-conductive material. A locking releasing elongate member is disposed to be movable to drive the locking releasing pin to the predetermined position upon contact with the locking releasing pin. The locking releasing elongate member is made of a conductive material and moved upon rotation of a locking releasing bolt connected with the elongate member. A conductive plate is securely disposed within the pin holder and positioned such that said locking releasing pin is contactable with the conductive plate when it is located at the predetermined position. A circuit closing device is provided to close an electric circuit when the locking releasing pin is brought into contact with the locking releasing elongate member and the conductive plate. Additionally, a warning device is electrically connected with said conductive plate and adapted to operate in response to closing of the electric circuit.

A second aspect of the present invention resides in a locking releasing device of an airbag sensor for an airbag restraint system. The airbag sensor includes a triggering device for enabling an airbag to inflate upon being released from its locking. The locking releasing device comprises a locking releasing pin movable to a predetermined position to release the triggering device from locking. The locking releasing pin is made of a conductive material. A pin holder is provided such that the locking releasing pin is movably disposed therein. The pin holder is made of a non-conductive material. A locking releasing elongate member is disposed to be movable to drive the locking releasing pin to the predetermined position upon contact with the locking releasing pin. The locking releasing elongate member is made of a conductive material and moved upon rotation of a locking releasing bolt connected with the elongate member. A conductive plate is securely disposed within the pin holder and positioned such that said locking releasing pin is contactable with the conductive plate when it is located at the predetermined position. A circuit closing device is provided to close an electric circuit when the locking releasing pin is brought into contact with the locking releasing elongate member and the conductive plate. Additionally, a warning device is electrically connected with said conductive plate and adapted to operate in response to closing of the electric circuit.

Accordingly, in order to release the airbag sensor from locking for disabling the triggering function, a mechanic rotates the locking releasing bolt to bring the locking releasing pin to the predetermined position through the locking releasing elongate member, so that the airbag sensor is released from locking. At this time, the locking releasing pin is pushed by the locking elongate member to be brought into contact with the conductive plate. Then, an electric circuit is closed to operate a warning device, informing the mechanic that the locking releasing pin suitably works so as to complete releasing of locking of the airbag sensor. Thus, the mechanic can be notified by the warning signal of the warning device that the locking releasing is accomplished, thus omitting the possibility of an insufficient locking releasing of the airbag sensor due to a insufficient tightening or rotation of the locking releasing bolt by the mechanic.

BRIEF DESCRIPTION OF DRAWINGS

In the drawings, like reference numerals designate like elements and parts throughout all the figures, in which:

FIG. 3 is a side view of an airbag sensor in accordance with the present invention;

FIG. 4 is an enlarged fragmentary sectional view of the airbag sensor of FIG. 3;

FIG. 5 is an enlarged perspective view of an essential part of the airbag sensor of FIG. 3;

DETAILED DESCRIPTION OF THE INVENTION

Figure 1A:
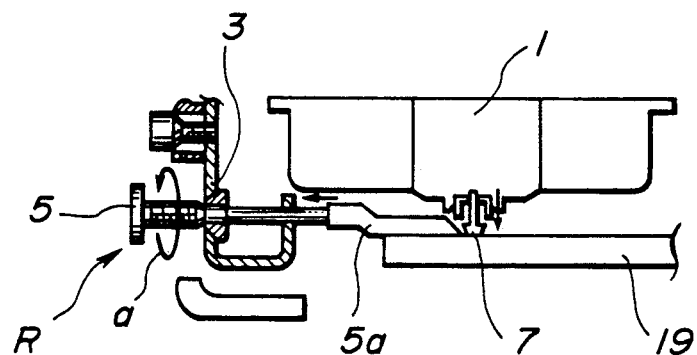
FIG. 1A is a side view of a conventional airbag sensor in its locked state.

To facilitate the understanding of the present invention, a brief reference will be made to a conventional airbag sensor 1, depicted in FIGS. 1A to 2C. The conventional airbag sensor is disclosed in a service manual published in September, 1989 by Toyota Motor Co., Ltd. The airbag sensor 1 forms part of an air bag restraint system (not shown) for protecting a vehicle passenger from comming into direct contact with either an instrument panel (not shown), a steering wheel (not shown) or a front windshield (not shown) in the event of a serious collision, particularly of a head-on or frontal collision. The airbag sensor 1 includes a sensor mechanism S to sense a vehicle collision (or an impact force over a predetermined level) and trigger the inflation and development of an airbag (not shown) which is usually disposed in its folded state inside the instrument panel and/or the padded steering wheel. The inflated and developed airbag provides a soft cushion for the vehicle passenger in the event of the serious collision.

The sensor mechanism S is disposed inside a housing (not identified) of the airbag sensor 1 and includes a locking shaft 9 which is slidably movably disposed along the axis of the airbag sensor 1. The locking shaft 9 is usually biased downwardly (in FIG. 1B) by a spring 17. Locking levers 11, 11 are provided to be driven or operated by the locking shaft 9. The locking levers 11, 11 function to restrict and allow the rotational movement of a trigger shaft 13. The trigger shaft 13 is rotationally moved by a ball 15 under the force of inertia at a vehicle collision. A balancer 13A is provided for the trigger shaft 13. A firing pin 21 is provided to be operated or actuated by the trigger shaft 13. Upon operation or actuation of the firing pin 21, the inflation and development of the airbag is triggered. It will be understood that the locking shaft 9 and the locking levers 11 constitute a locking mechanism L for disabling the sensor mechanism S from the sensing and triggering.

Figure 1B:
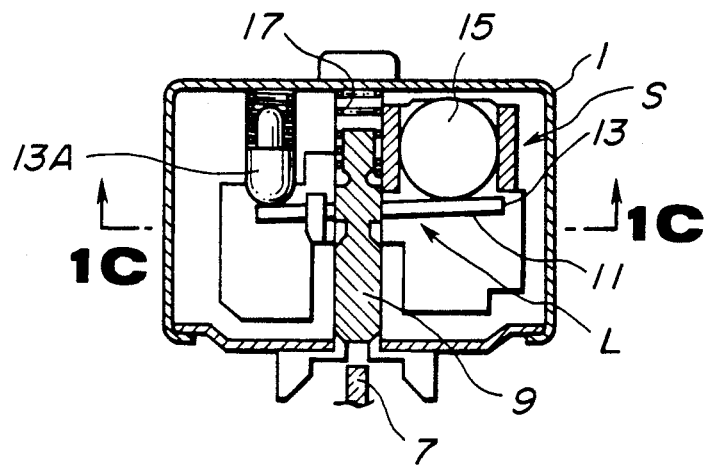
FIG. 1B is an enlarted fragmentary sectional view of the airbag sensor of FIG. 1A in the locked state.
Figure 1C:
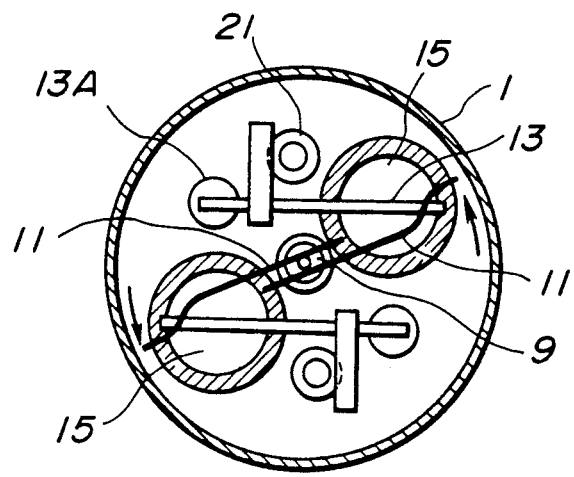
FIG. 1C is a sectional view taken in the direction of arrows substantially along the line 1C—1C of FIG. 1B.

FIGS. 1A to 1C show the airbag sensor 1 in a condition in which the sensor mechanism S is put into its locked state. The locked state of the sensor mechanism S is obtained by rotating a locking releasing bolt 5 in a direction of an arrow a to be loosened. The locking releasing bolt 5 is rotatably disposed near the main body of the airbag sensor 1 and screwed through a bolt holder 3. Upon loosening the locking releasing bolt 5, an operating memer 5a connected to the locking releasing bolt 5 separates from a locking releasing pin 7 which is supported on a pin holder 19.

When the locking releasing pin 7 is separated from the locking shaft 9 as shown in FIGS. 1A and 1B, the locking shaft 9 is pushed downwardly under the bias of the spring 17, so that the locking levers 11, 11 are in positions to restrict the rotational movement of the trigger shaft 13. Accordingly, if a high deceleration is applied to the ball 15, the trigger shaft 13 cannot make its rotational movement. As a result, the firing pin 21 is not operated, and therefore the airbag cannot be inflated and developed.

Figure 2A:
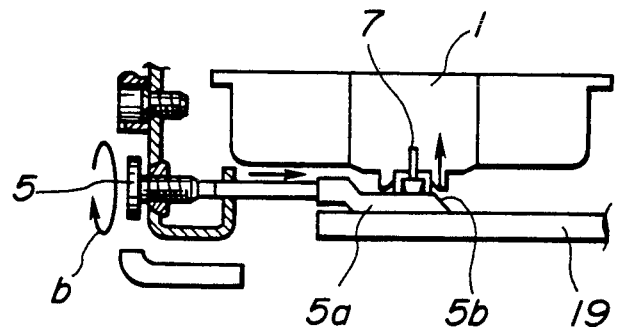
FIG. 2A is a side view similar to FIG. 1A but showing the conventional airbag sensor of FIG. 1A in its unlocked state in which the airbag sensor is released from its locking.
Figure 2B:
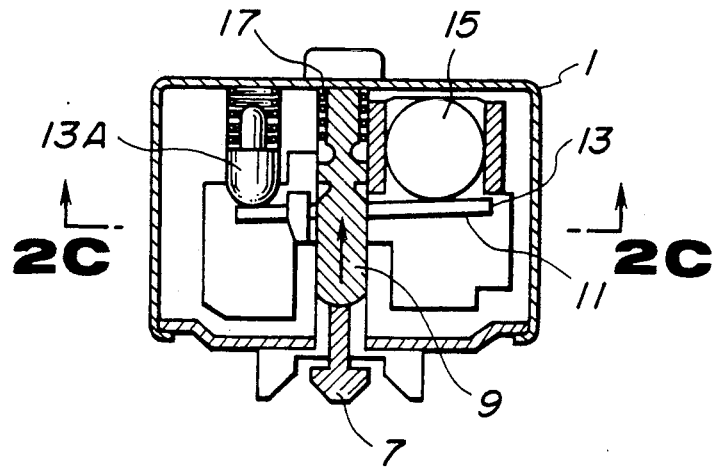
FIG. 2B is an enlarged fragmentary sectional view of the airbag of FIG. 2A in the unlocked state.
Figure 2C:
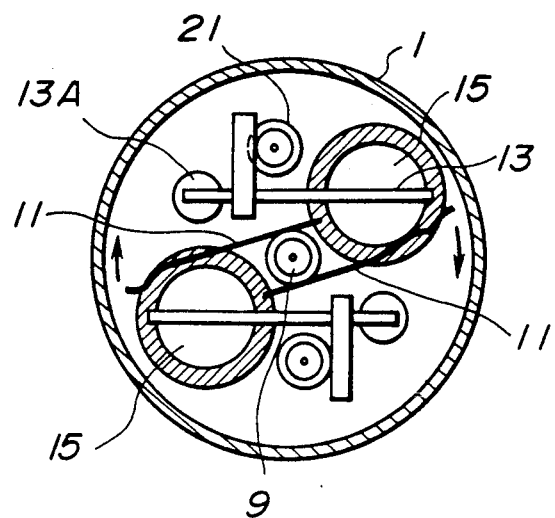
FIG. 2C is a sectional view taken in the direction of arrows substantially along the line 2C—2C of FIG. 2B.

In order to release the sensor mechanism S from the locking, i.e., put the sensor mechanism S into its unlocked state, the locking releasing bolt 5 is rotated in the direction of an arrow b to be tightened as shown in FIG. 2A. Then, the operating member 5a connected with the rocking releasing bolt 5 slidingly moves rightward (in FIG. 2A) along the upper surface of the pin holder 19 thereby to raise the locking releasing pin 7 under cooperation of the tapered section of the locking releasing pin 7 and the inclined surface 5b formed at the tip end part of the operating member 5a. The thus raised locking releasing pin 7 pushes up the locking shaft 9 as shown in FIG. 2B, so that the location of the locking levers 11, 11 shifts in the directions indicated by arrows in FIG. 2C. Consequently, the locking levers 11, 11 are disengaged respectively from the trigger shafts 13, 13 so as to release the restriction against the rotational movement of the locking levers 11, 11. In this condition, when a high deceleration is applied to the ball 15, the trigger shafts 13, 13 make their rotational movement thereby to operate or actuate the firing pin 21. As a result, the initiator is fired to operate the inflator to inflate and develop the airbag. As discussed above, the locking releasing bolt 5 and the operating member 5a form part of a locking releasing device R for releasing the sensing mechanism S from the locking.

However, drawbacks have been encountered in the above discussed conventional airbag sensor. That is to say, the locking releasing for the conventional sensor mechanism S depends only on the rotation of the locking releasing bolt 5 under a manual operation of the mechanic, so that an operational reliability is poor. More specifically, it is unavoidable that length of the locking releasing bolt 5 and length of the locking releasing pin 7 wall slightly deviate throughout many productions because of limited precision in production. Accordingly, it is difficult to accurately confirm from the outside as to whether or not the locking releasing pin 7 is sufficiently upwardly moved to a predetermined position when the locking releasing bolt 5 is tightened. Additionally, there is the possibility of insufficient tightening of the locking releasing bolt 5 when the mechanic operates the locking releasing device R of the airbag sensor 1. The presence of such insufficient tightening in releasing the locking also cannot be confirmed. As a result, there is the possibility of a user driving a vehicle equipped with the airbag restraint system whose airbag sensor remain locked thus preventing a proper operation of the airbag.

In view of the above description of the conventional airbag sensor, reference is now made to FIGS. 3 to 7 wherein the same reference numerals as those in FIGS. 1A to 2C designate the same elements and parts. In FIGS. 3 to 7, a preferred embodiment of the airbag sensor of the present invention is illustrated by the reference numeral 1A. The airbag sensor 1A comprises the sensor mechanism S including the locking shaft 9 which is vertically movable in FIGS. 3 and 4. The airbag sensor 1A comprises a locking releasing device RA which includes a generally cup-shaped pin holder 25 which is made of a non-conductive material through which electicity in not conductive. The pin holder 25 is fixedly secured to the bottom of a housing 2 inside which the sensor and the locking mechanism L are disposed.

The pin holder 25 includes a cylindrical wall section 25a whose upper end is integrally closed with an upper wall section 25b. The upper wall section 25b is formed with a central hole 25c. The cylindrical wall section 25a is formed at its lower end with a generally annular flange section 25d. The sections 25a, 25b and 25d are integral with each other to form a one-piece structure. A bolt passing opening 27 is formed through the flange section 25d and the lower part of the cylindrical section 25a.

The locking releasing pin 7 is slidably supported inside the pin holder 25 and made of a conductive material through which electricity is conductive. The locking releasing pin 7 includes a large-sized base or head section 7a located inside the pin holder 25, and a pin section 7b whose major part is projectable outside of the pin holder 25 though a through-hole 29a in a conductive plate 29 (discussed after) and the central hole 25c in the pin holder upper wall 25b. The base section of the locking releasing pin 7 is formed at its lower part with a tapered or frusto-conical portion 7c.

The conductive plate 29 is fixedly secured to the inner surface of the upper wall 25b of the pin holder 25, and formed at its one end section with the through-hole 29a located to be coincident with the hole 25c in the pin holder upper wall 25b. The conductive plate 29 extends passing through the cylindrical wall section 25a of the pin holder 25 so that the other end section thereof projects out of the pin holder 25.

The operating member 5a, made of an electrically conductive material, connected with the locking releasing bolt 5 is inserted into the pin holder 25 through the bolt passing opening 27. At its tip end membered 5a has an inclined surface 5b which is contiguous with its upper surface. The inclined surface 5b is fitted and slidably contactable with the tapered surface of the tapered portion 7c of the locking releasing pin 7. The locking releasing bolt 5 is screwed through the bolt holder 3 and movable in the direction of an arrow c in FIG. 6 by a manual operation of the mechanic.

Figure 7:
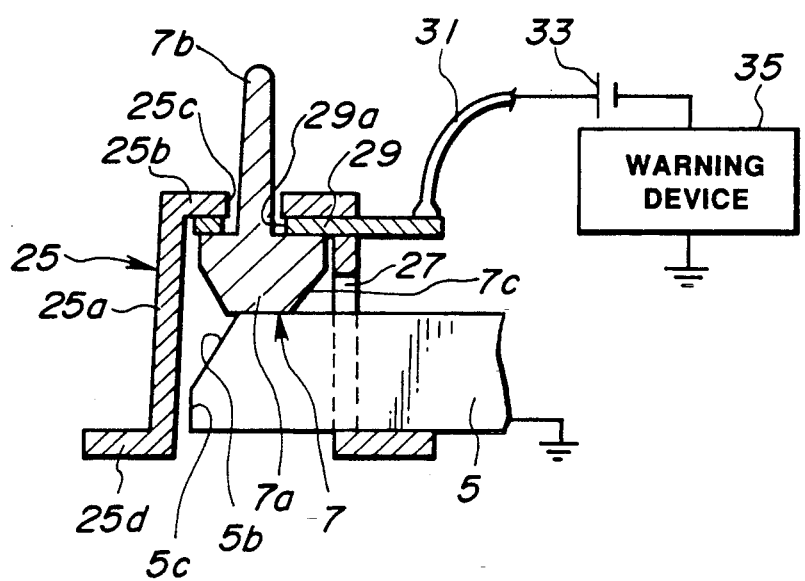
FIG. 7 is a vertical sectional view similar to FIG. 6 but showing an electric circuit including a warning device.

As shown in FIG. 7, an end portion of a conductive wire 31 is connected with the conductive plate 29 at the section projected outside of the pin holder 25. The conductive wire 31 is connected through an electric source or battery 33 with a warning device 35. The warning device 35 is arranged to generate a warning signal when not supplied with electric current from the electric source 33 and to stop generation of the warning signal when supplied with the electric current from the electric source 33.

The sensor and locking mechanisms S, L of the airbag sensor 1A of this embodiment is the same as those of the conventional airbag sensor 1, and therefore the explanation of them are omitted for the purpose of simplicity of illustration.

The manner of operation of the above-discussed locking releasing device RA will be discussed hereinafter.

Figure 6:
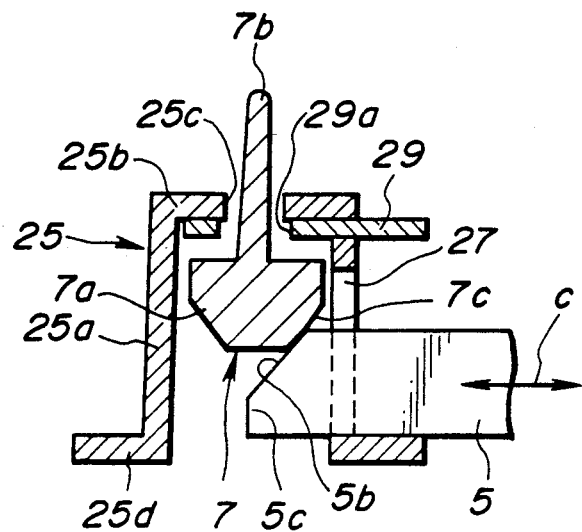
FIG. 6 is a vertical sectional view taken in the direction of arrows substantially along the line 6—6 of FIG. 5.

When the operating member 5a of the locking releasing bolt 5 is in a position shown in FIG. 6, the tip end portion of the pin section 7b of the locking releasing pin 7 is not sufficiently projected upwardly, so that the locking shaft 9 is not sufficiently pushed up to a position to release the sensor mechanism S from locking. Accordingly, the sensor mechanism S is maintained at its locked condition, and therefore the warning device 35 generates the warning signal.

When the locking releasing bolt 5 is manually tightened or rotated in the direction of the arrow b by the mechanic as shown in FIG. 3, the operating member 5a of the locking releasing bolt 5 is moved leftward (in FIG. 6) from the location shown in FIG. 5. Then, under a slidably contacting effect of the inclined surface 5b of the operating member 5a and the tapered portion 7c of the locking releasing pin 7, the locking releasing pin 7 completes its travel along the operating member 5a as shown in FIG. 7. Accordingly, the locking shaft 9 is pushed up to a position to shift the locking levers 11, 11 to the respective locations (shown in FIG. 2C) at which the sensor mechanism S is released from the locking by the locking mechanism L.

At this time, the base section of 7a of the locking releasing pin 7 is brought into contact with the conductive plate 29, and therefore a circuit through the electric source 33 and the warning device 35 is closed so that electric current is passed through the warning device 35. As a result, the warning device 35 stops generation of the warning signal, representing completion of releasing the sensor mechanism S from locking by the locking mechanism L. Consequently, the sensor mechanism S can be normally and rightly operated to allow the airbag (not shown) to inflate and develop at a vehicle collision at which an impact force exceeds a predetermined level. It will be understood that a conventional buzzer or a lamp may be used as the warning device 35.

Thus, during a maintenance operation of the vehicle, it is sufficient that the mechanic tightens the locking releasing bolt 5 until the warning signal of the warning device 35 stops, thereby omitting the possibility of occurrence of insufficient locking releasing for the sensor mechanism S due to insufficient tightening of the locking releasing bolt 5.

What is claimed is:

1. A locking releasing device of an airbag sensor for an airbag restraint system, the airbag sensor including triggering means for enabling an airbag to inflate upon being released from a locked condition, said locking releasing device comprising:
- a locking releasing pin movable to a predetermined position to release the triggering means from the locked condition, said locking releasing pin being made of a conductive material and moved upon rotation of a locking releasing bolt connected with said locking releasing pin;
- a pin holder in which said locking releasing pin is movably disposed, said pin holder being made of a non-conductive material;
- a locking releasing elongate member movable to drive said locking releasing pin to said predetermined position upon contact with said locking releasing pin, said locking releasing elongate member being made of a conductive material;
- a conductive plate securely disposed within said pin holder and positioned such that said locking releasing pin is contactable with said conductive plate when said locking releasing pin is located at said predetermined position;
- means for closing an electric circuit when said locking releasing pin is brought into contact with said locking releasing elongate member and said conductive plate; and
- a warning device electrically connected with said conductive plate and adapted to operate in response to closing of said electric circuit.

2. An airbag sensor for an airbag restraint system, comprising:
  means for triggering an inflation of an airbag;
  locking means for locking said triggering means so as to disable said triggering means from triggering in a first state, and unlocking said triggering means so as to allow said triggering means to trigger in a second state; and
  locking releasing means for putting said locking means into said second state, including:
  a locking releasing pin movable to a predetermined position at which said locking means is put into said second state, said locking releasing pin being made of a conductive material,
  a pin holder in which said locking releasing pin is movably disposed, said pin holder being made of a non-conductive material,
  a locking releasing elongate member movable to drive said locking releasing pin to said predetermined position upon contact with said locking releasing pin, said locking releasing elongate member being made of a conductive material and moved upon rotation of a locking releasing bolt connected with said locking releasing elongate member,
  a conductive plate securely disposed within said pin holder and positioned such that said locking releasing pin is contactable with said conductive plate when it is located at said predetermined position;
  means for closing an electric circuit when said locking releasing pin is brought into contact with said locking releasing elongate member and said conductive plate, and
  a warning device electrically connected with said conductive plate and adapted to operate in response to closing of said electric circuit.

3. An airbag sensor as claimed in claim 2, wherein said pin holder includes a generally cylindrical wall section, and an end wall section closing an end of said cylindrical wall section and formed with a center hole, wherein said locking releasing pin includes a base section disposed inside said cylindrical wall section, and a pin section projecting outside said pin holder through said center hole, wherein said conductive plate is located between said pin holder end wall section and said locking releasing pin base section.

4. An airbag sensor as claimed in claim 3, wherein said locking releasing elongate member extends through said pin holder cylindrical wall section and is movable generally perpendicularly to the axis of said locking releasing pin.

5. An airbag sensor as claimed in claim 4, wherein said locking releasing elongate member has a tip end section locatable inside said pin holder and formed with an inclined surface, wherein said locking releasing pin is formed with a tapered surface which is slidably contactable with said inclined surface of said locking releasing elongate member in a manner that said locking releasing pin is moved toward said predetermined position when said locking releasing elongate member tip end section is moved over a longitudinal axis of said locking releasing pin.

6. An airbag sensor as claimed in claim 2, wherein said warning device is arranged to generate a warning signal when said electric circuit is opened and to stop generation of said warning signal when said electric circuit is closed.

7. An airbag sensor as claimed in claim 2, wherein said triggering means is adapted to trigger the airbag inflation when a collision occurs.

* * * * *